June 9, 1953 P. F. M. GLOESS ET AL 2,641,699

MULTIPLEX PULSE TIME MODULATION SYSTEM

Filed March 25, 1949 2 Sheets-Sheet 1

INVENTORS:
PAUL FRANCOIS MARIE GLOESS
and LOUIS JOSEPH LIBOIS
By: Haseltine, Lake & Co.
AGENTS June 9, 1953 P. F. M. GLOESS ET AL 2,641,699

MULTIPLEX PULSE TIME MODULATION SYSTEM

Filed March 25, 1949 2 Sheets-Sheet 2

INVENTORS:
PAUL FRANCOIS MARIE GLOESS
and LOUIS JOSEPH LIBOIS
By: Hazeltine, Lake & Co.
AGENTS Patented June 9, 1953 2,641,699

UNITED STATES PATENT OFFICE 2,641,699

MULTIPLEX PULSE TIME MODULATION SYSTEM

Paul François Marie Gloess and Louis Joseph Libois, Paris, France

Application March 25, 1949, Serial No. 83,302
In France March 27, 1948

4 Claims. (Cl. 250—27)

This invention relates to improvements in multiplex systems of transmission by electric pulses using modulation by time-displacement of the pulses.

In most hitherto known multiplex communication systems, each communication channel is assigned, for a given pulse-train, a time period longer than or at least equal to the value of the maximum displacement that may be undergone by the modulated pulse transmitting the intelligence, this pulse occurring at about the middle of this time-period when modulation is zero. So, whatever may the amplitude of the modulation be in the different communication channels, the average time-interval between two pulses connected with consecutive channels is constant.

It is, however, well-known that if a determined number of telephonic channels in operation are grouped, and if the amplitude of all the signals is analyzed at any moment, it will be found on the average that the respective amplitudes of at least half the number of channels are zero, and that only a few among the remaining ones have maximum amplitudes. The consequence is that in most presently known systems of transmission by time-displacement of pulses, the time-interval allotted to the transmission of a pulse train is not fully taken advantage of and includes considerably more dead periods than useful ones.

The present invention relates to special electronic devices for multiplex electric pulse transmission systems wherein the previously mentioned disadvantages are eliminated by the use of that type of modulation wherein a pulse of a channel is modulated by time-displacement from a position depending on the instantaneous position of the pulse of the preceding channel.

According to a first feature of the invention, each pulse is modulated from a position presenting a constant time-difference with the instantaneous position of the pulse of the preceding channel. In other words, the position of each pulse in relation to a pilot pulse is determined by the sum of the modulations undergone by this pulse and by the preceding pulses in the considered train of pulses, a convenient staggering in time being further added in order to take in account the possibility of a zero modulation of one of several pulses.

According to another feature of the invention, every pulse is no more modulated about an average position, but from a position presenting a very small time-difference with the instantaneous position of the pulse immediately preceding it on the preceding channel, after having previously transformed the modulation signals into unipolar signals by adding to them a rectified direct-current component of amplitude substantially proportional to that of said modulation signals, according to, a technique related to that of the "noiseless" type of motion-picture sound recording or of the "floating carrier" radio-telephonic transmission. This very small time difference can be obtained in several ways, one way being that of adding to each transformed modulation signal a small direct current component so that, in case of zero modulation in one channel, the corresponding transformed modulation signal never takes a zero value. This is intended to avoid overlapping of successive pulses in the said case of zero modulation in one channel. However such a provision is not always necessary, as it will be hereinafter seen from the description of some electronic pulses producing devices which are embodiments of the invention, a natural time delay between successive pulses occurs from the principle of functioning of the said devices, thanks to the finite time interval necessary to an electron beam for going from one position in space to another. In the latter case, the existence of a minimum delay between two successive pulses is thus guaranteed by the construction of the electronic device itself which generates the said pulses.

Other objects, characteristics and advantages of the invention will appear from the description of a few particular cases of embodiment, given as examples, but not implying a limitation of its scope.

The description is referred to the annexed drawings wherein:

Figure 1 shows an example of embodiment of the invention, in which a cathode-ray tube 54 is used. It has been supposed there that four communication channels are to be simultaneously transmitted, but it must be well understood that this small number has only been chosen for simplification of the drawing, and that the shown embodiment is not in the least limited to this number of channels.

Figures 1, 2:
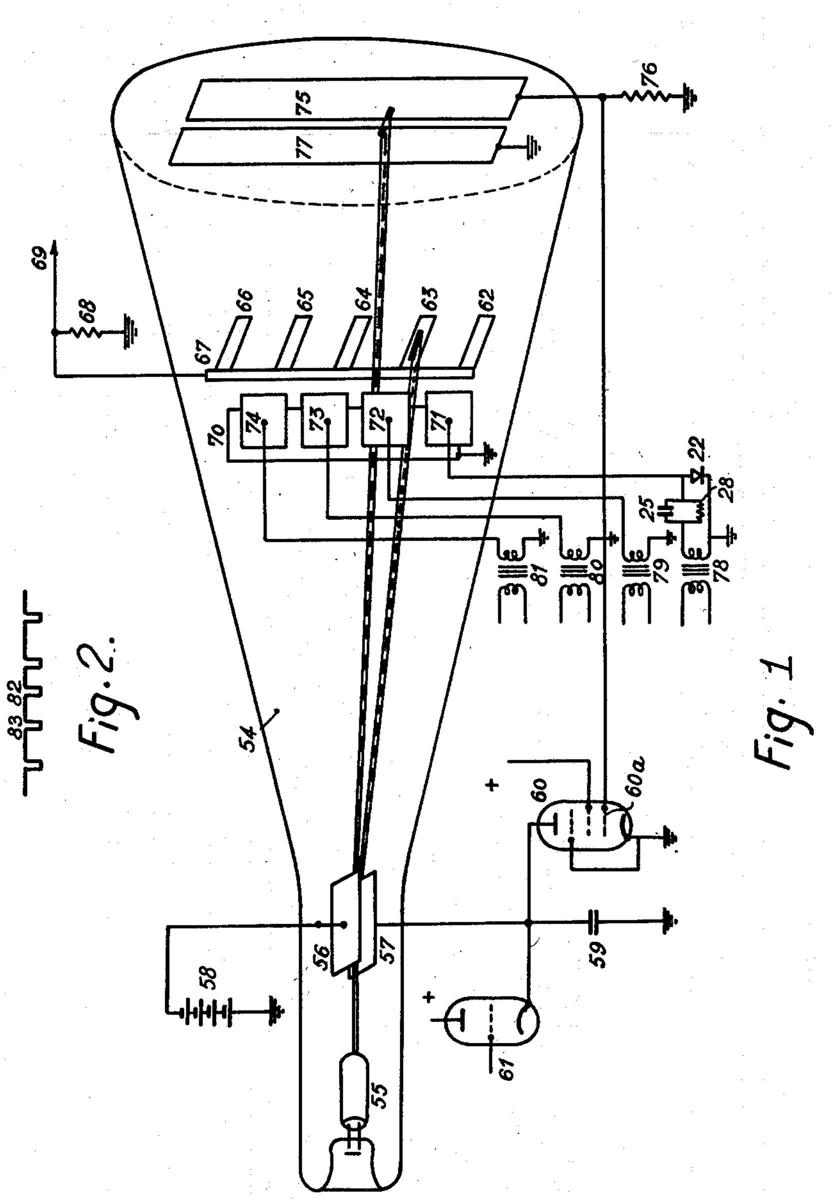
Figure 1 shows a diagrammatical example of a device embodying characteristics of the invention.
Figure 2 is a diagram in connection with the description of Figure 1.

The operation is as follows:

The electron gun 55 produces a beam of electrons flattened in width, by means of a suitable electron optics, for instance by mere astigmatism. This beam is periodically deflected vertically from up to down for instance, with quick returning down under action of the deflecting system 56, 57. The element 56 is connected to the earth potential through a direct-current potential source 58 provided for framing the beam, and element 57 is connected with one of the terminals of a condenser 59 whose other terminal is earthed. This condenser is negatively charged by an electronic tube 60 such as a pentode, and is periodically discharged by a tube 61 which causes a quick fly-back of the beam. Of course, arrangements may be taken to switch the beam off during the fly-back. So a generator of saw-tooth waves such as those shown on diagram of Figure 2 is obtained.

In the course of every sweeping from down to up, the beam strikes a rake-shaped electrode formed of the parts or arms 62, 63, 64, 65, 66 joined by a connection 67 to a load-resistance 68. A series of five pulses represented on diagram of Figure 2 is thus obtained.

Besides, tube 54 includes a manifold system of transversal deflection, made of a common earthed plate 70 and of four distinct plates 71, 72, 73 and 74, the whole system being of course possibly set up in front of or beyond the system of vertical deflection.

Lastly a target 75 is disposed at the end of the tube 54. This target is connected on one hand to the earth by a load resistance 76, on the other hand to the control electrode 60*a* of tube 60. Moreover, an earthed counter-target 77, intended to stop the part of the beam which does not strike the target 75, has been represented, but it is obvious that this counter-target might be eliminated without modification of the character of the deflection.

Plates for horizontal deflection 71, 72, 73 and 74 are respectively connected to the communication circuits through matching transformers 78, 79, 80 and 81 and their respective voltages correspond at any moment to these channel modulation amplitudes.

It may be assumed for instance that the beam has just struck the electrode arm 63. It then passes between the horizontal deflection plates 72 and 70. The voltage of plate 72 being a function of the present modulation of the second communication channel, the beam undergoes a horizontal deflection which is itself a function of this modulation. It then more or less completely strikes the electrode 75, and so supplies to the terminals of resistance 76 a voltage which is also a function of the considered channel instantaneous modulation. This voltage is applied to the control electrode of tube 60 and so controls the output of this tube. It consequently determines the charging speed of condenser 59, i. e. the time in which the cathode beam reaches electrode arm 64 after leaving electrode arm 63. The pulse 82 Figure 2, produced by the beam when it strikes the collecting electrode arm 64 corresponding to the second communication channel is then delayed relatively to the pulse 83 Figure 2 of the first channel by a quantity which is a function of the instantaneous modulation of the second channel. Same phenomena successively takes place for all the communication channels, and a system is so established, in which every pulse of a train is delayed relatively to the immediately preceding one by a time-interval depending upon the magnitude of the modulation applied at this instant to the channel to which the considered pulse corresponds.

On Figure 1, there has been represented in series with the connection between the channel transformer 78 and the deflecting plate 71 a peak-levelling circuit consisting of a rectifier 22 and of a condenser 25 in parallel with a resistance 28.

The function of this circuit is to transform alternating-current modulation signals from transformer 78, into modified modulation signals by adding to them a direct-current component substantially equal to the instantaneous envelope amplitude of said alternating-current signals. The polarity of rectifier 22 is chosen so as to cause the modulation applied to the input side of transformer 78 to shift the average voltage of plate 71 in the positive direction and subsequently to decrease the deflection speed of the cathode ray beam and to increase the interval between pulse 83 and the immediately preceding pulse, said interval being adjusted to a minimum value for the condition of zero modulation.

It is obvious that corresponding peak-levelling circuits may advantageously be added in series with the secondary windings of transformers 78, 80 and 81 corresponding to the other channels. In order to simplify the drawing, these circuits have not been represented on Figure 1.

Figures 3, 4:
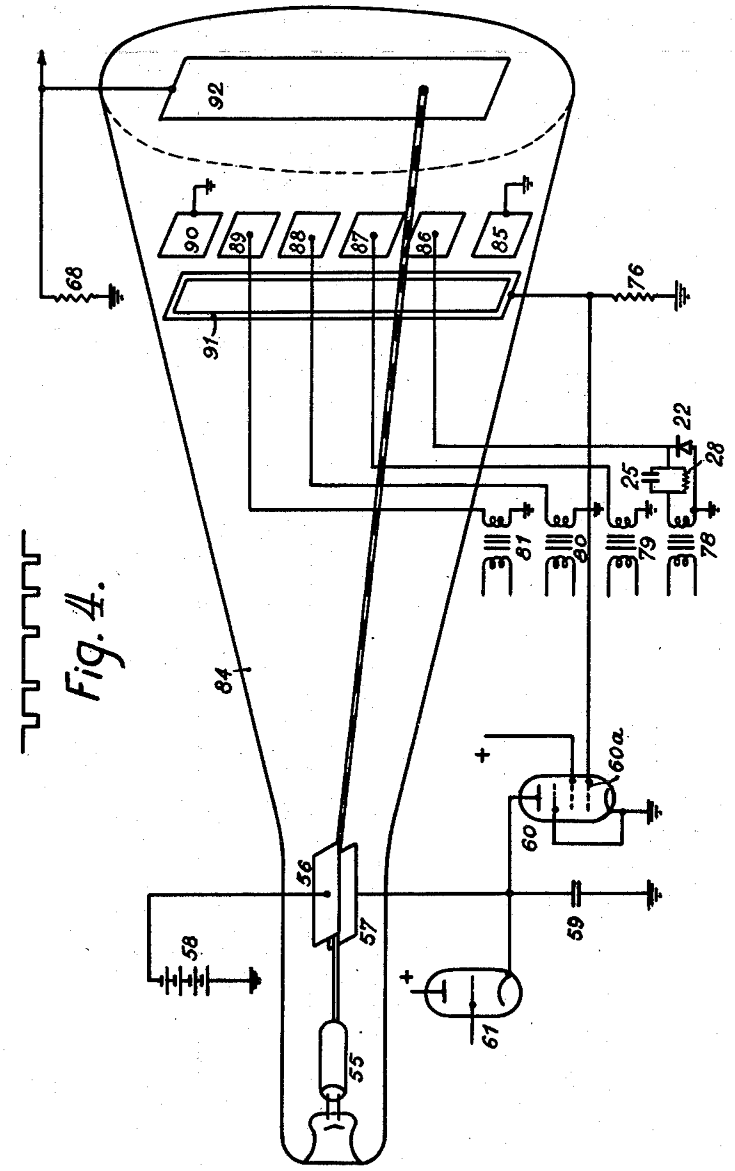
Figure 3 shows another example of a device including characteristics of the invention.
Figure 4 is a diagram showing the signal obtained from the device on Figure 3.

On Figure 3, a variant of the device on Figure 12 has been represented. Elements of this variant identical to those on Figure 1 bear same references.

Tube 84 includes a vertical saw-tooth sweeping system similar to that of tube 54 on Figure 1.

In course of the sweeping from up to down, the electronic beam successively strikes the targets 85, 86, 87, 88, 89 and 90.

Targets 86 to 89 are respectively connected to the communication channel circuits and targets 85 and 90 are earthed. Every time the beam strikes one of these targets 85 to 90, it causes a secondary electron emission, the intensity of which is a function of the voltage applied to the struck target. The secondary electrons are collected on a collector electrode 91 connected on one hand to a terminal of the load resistance 76, and on the other hand to the control electrode 60*a* of tube 60.

If, for instance, the voltage applied to target 86 is considered, at the instant when the cathode beam strikes it, this voltage is a function of the instantaneous amplitude, at this instant, of the signals from the first communication channel. Electrons collected on electrode 91 supply the control electrode of tube 60 with a voltage which is a function of this amplitude, and consequently condenser 59 is charged with a speed determined by that amplitude. The result is that the beam sweeps the target 86 with a velocity proportional to the instantaneous modulation of the communication channel corresponding to that target.

In its displacement between each of electrodes 85 to 90, the beam strikes a further target 92 connected to the load-resistance 68 at the terminals of which a pulse signal such as that on diagram of Figure 4 is received, every pulse being delayed relatively to the immediately preceding one by a quantity proportional to the modulation of the channel to which the considered pulse corresponds.

It will be noted on Figure 4 that the modulated pulse widths are variable. In fact, in its path between the consecutive targets 85 and 90, the initial velocity of the beam is that applied to it by the target it has just left. So, the pulse widths themselves are an indication of the modulation they respectively carry, and the pulses are modulated in a complex manner both in time and in duration.

Through target 85, the fore-edge of the pilot pulse may be defined, and target 90 causes the back edge of the last channel pulse to appear.

In the same manner as already done in the case of Figure 1, a peak-leveling circuit has been represented, by way of example, in series with the secondary winding of transformer 78. This circuit consists of rectifier 22, condenser 25 and resistance 28. It is obvious that similar circuits may advantageously be added in series with each of the secondary windings of the other transformers 79, 80 and 81.

It is obvious that the examples described have been given merely as illustrations, and that many variants and modifications in shape and structure of the described devices may be imagined without going beyond the scope of the invention.

For instance, when using a cathode-ray tube for a large number of communication channels, it may be profitable to replace the linear saw-tooth sweeping system by a circular one, the beam being radially deflected in a single direction as a function of the instantaneous modulations of the different channels. Many devices for embodying such a sweeping system are known, and it must be understood that their use does not go beyond the scope of the invention.

We claim:

1. In a multiplex time division pulse communication system using recurrent groups of pulses, each group comprising a number of pulses at least equal to that of the communication channels plus one, and wherein the individual modulation signals of a number of communication channels are represented by the time intervals between two successive pulses in each group, transmitting apparatus comprising a cathode-ray beam tube including electro-optical means for flattening its beam in a direction parallel to a given first direction, a first deflecting device for periodically deflecting said beam in a second direction perpendicular to said first direction and bringing it back rapidly to its initial positon, a second deflecting device comprising pairs of electrodes, in number equal to that of communication channels for deflecting said beam in said first direction, each pair of electrodes being submitted to a unipolar voltage obtained by adding to the alternating modulation signal voltage of one corresponding communication channel a rectified direct-current component substantially proportional to the amplitude of said signal voltage, a rake-shaped electrode connected to a point at a fixed potential through a first resistor and arranged so as to be swept by the beam during its movement parallel to said second direction, a target connected to a point at a fixed potential through a second resistor and arranged so as to be struck by the beam after its having swept said rake-shaped electrode, means for impressing voltage received at the terminals of said second resistor so as to influence deflection speed of above said first deflecting device, and means for impressing voltage received at the terminals of said first resistor upon a communication circuit.

2. Apparatus as in claim 1, wherein a counter-target at a fixed potential is arranged side-to-side with the target in order to stop the part of the beam which does not strike said target.

3. Apparatus according to claim 1, wherein the first deflecting device comprises a condenser whose armatures assume a variable voltage difference under the action of a control device fed from the second resistor.

4. Apparatus according to claim 1, wherein one of the electrodes of each pair of electrodes in second deflecting device is connected to a point at a fixed potential.

PAUL FRANÇOIS MARIE GLOESS.
LOUIS JOSEPH LIBOIS.

References Cited in the file of this patent

UNITED STATES PATENTS

| Number | Name | Date |
|---|---|---|
| 2,429,631 | Labin et al. | Oct. 28, 1937 |
| 2,466,230 | Goldberg | Apr. 5, 1949 |
| 2,467,486 | Krumhansl | Apr. 19, 1949 |
| 2,471,138 | Bartelink | May 24, 1949 |
| 2,492,004 | Potier | Dec. 20, 1949 |
| 2,497,411 | Krumhansl | Feb. 14, 1950 |
| 2,498,688 | Lesti | Feb. 28, 1950 |

FOREIGN PATENTS

| Number | Country | Date |
|---|---|---|
| 610,774 | Great Britain | Oct. 20, 1948 |